May 7, 1929.  I. WILLIAMS  1,711,866
METHOD OF AND APPARATUS FOR TESTING MATERIALS
Filed June 1, 1927   2 Sheets-Sheet 2
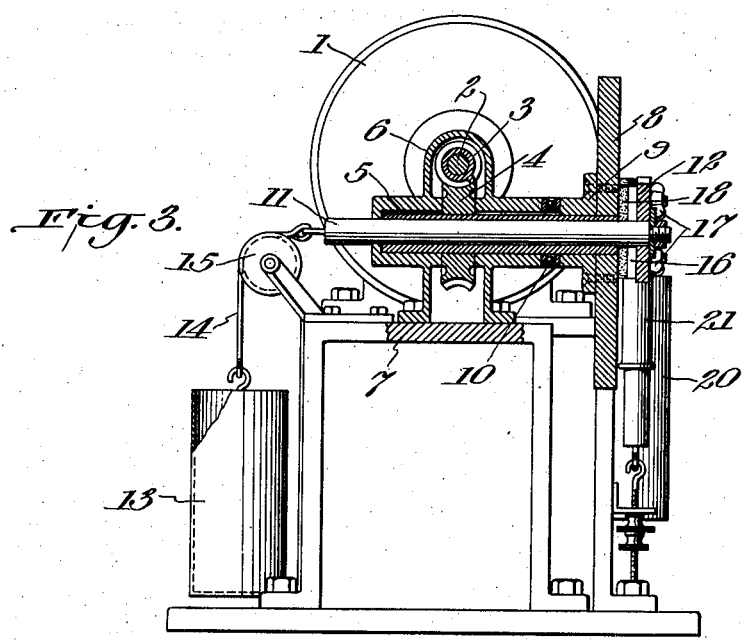

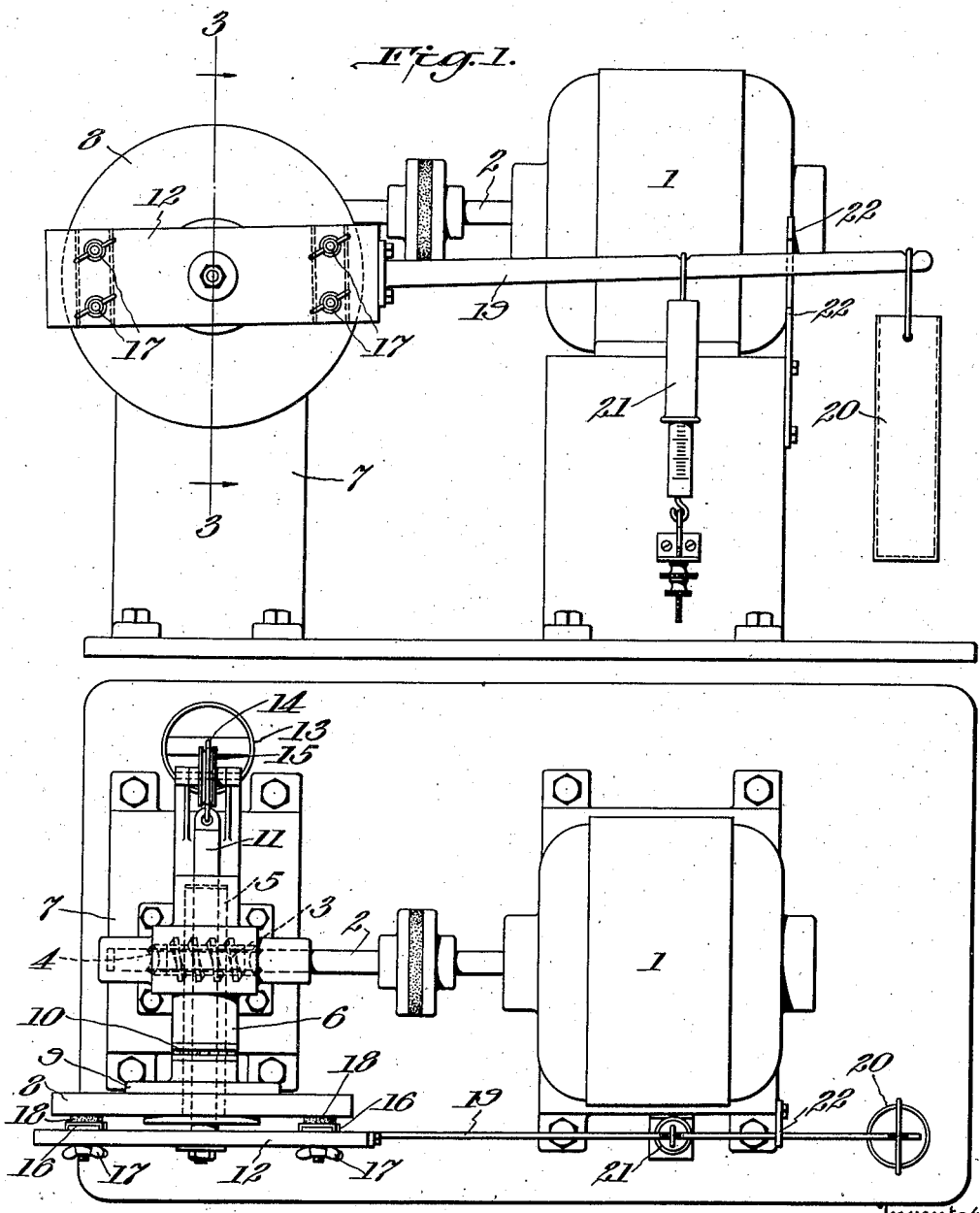

Patented May 7, 1929.

1,711,866

UNITED STATES PATENT OFFICE.

IRA WILLIAMS, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

METHOD OF AND APPARATUS FOR TESTING MATERIALS.

Application filed June 1, 1927. Serial No. 195,780.

This invention relates to the testing of materials and more particularly to the testing of materials for their resistance to wear. While applicable to a number of commercial articles, such as leather or composition shoe soles, linoleum, etc., my invention has been found exceedingly useful in testing automobile tire treads.

In making tests for wear resistance, it is now common practice to cause a sample of the material in the form of a smooth uniform block to move for a standard time or standard distance in surface contact with an abrasive member and to determine the volume of original material removed from the sample by such abrasion. Samples of various materials to be tested are thus abraded under identical conditions of area of contact, speed, pressure of contact, etc. and the materials are graded according to the respective volume losses of the samples. While the data obtained by such an operation are quite useful in certain instances, they have never shown any direct relation or proportionality to the actual wear during practical use of the material made from the tested material, and all attempts have failed to produce a machine based on the above principle which would give figures indicative of the life, or abrasive resistance, that could be expected from the article when subjected to its usual and normal applications.

In the usual tests as above described, when a sample of material such as a rubber tire tread is moved in a testing machine, uniformly across an abrasive surface, work is done on the sample, due to frictional resistance and wearing away of the sample.

When samples of different materials are thus tested under conditions which appear to be identical, it does not follow that the work done on each sample is the same, even though the amounts of material removed from the samples by such test are the same. The present-day testing machines supply an excess of power for the relative surface movement of the abrasive member and the sample and no account is taken of the actual work done or energy consumed in the test.

The energy transmitted between two sliding members which are pressed into contact with each other is not determined solely by their relative speed, contact area and total or unit pressure, which factors have been previously considered to be sufficient to establish identical conditions for the testing of samples to determine their relative resistance to wear. One of two specimens which showed equal losses in volume under test conditions which were believed to be identical may have transmitted more than twice as much power as the other specimen. This is because the sliding resistance, interior friction, and other factors influence the abrasion change when the composition of the rubber is varied.

I have found that the loss of material on abrasion when expressed in relation to the work performed, or energy consumed in such abrasion, bears a close relation to the wearing qualities of the material, both data being in direct relation to each other.

This invention, therefore, comprises a method of testing and a machine for carrying out the method which take into consideration the amount of energy consumed during abrasion of a material, and express the abrasion loss in relation to the energy required to effect that loss. Such relation of loss in material per unit of power gives a direct indication of the actual wearing quality of the material in use.

The method may be practiced by using an abrasive wheel against which the test piece is applied under pressure, and revolving the wheel at constant speed for a given length of time, or revolving it a predetermined number of revolutions; the work done being measured by the power consumed in the motor used to turn the wheel.

Another method of measuring the work done is to apply the test piece against the abrasive wheel with pressure, revolve the wheel by means of a motor for a standard number of turns, or a given length of time at a constant speed, and prevent the test piece from revolving with the wheel by fixing it to a lever counterbalanced so as to exactly balance the pull of the wheel. Such a device is similar to a Prony brake as used in power measurements of a motor. The same formula as used for a Prony brake is applicable here. If the weight at the end of the balanced lever is "$W$", "$l$" the length of the lever in feet, and "$n$" the number of revolutions per minute, the horse power consumed by the frictional resistance of the test piece when held balanced against the abrasive wheel is $$\frac{2\pi ln W}{33,000}$$

A sample of a given material being tested on such a machine for, say, 20 minutes, and having lost 3.00 cubic centimeters of volume, while the power consumed figured from the above formula was 0.01 H. P., the loss per H. P. hour would be $$\frac{3\times 3}{0.01}=900 \text{ c. c.}$$

Another sample of rubber, of different composition, tested under identical conditions as to surface of the sample, time, temperature, etc., lost 2.50 cc. while the power consumed was 0.015 H. P., the loss per H. P. hour was—

$$\frac{2.5\times 3}{0.015}=500 \text{ c. c.}$$

The ratio of abrasion resistance, when figured on the loss of material alone, would amount to 0.83:1, whereas when figured on the loss per H. P. hour, it amounts to 0.55:1 in the two samples. As a matter of fact, actual road tests have shown that tire treads made from the second sample of rubber had nearly twice the life, or resistance to wear, of tires made from the first rubber. This checks with the figures obtained according to my method of testing, whereas from the usual test comprising only the loss on abrasion, no such difference in the life of a tire could be expected.

For a better understanding of this invention reference may be had to the accompanying drawings showing one embodiment thereof, similar reference characters designating like parts, wherein Fig. 1 is a side elevation of the testing machine.

Fig. 2 is a top plan thereof, and

Fig. 3 is an end elevation, parts of the machine being shown in section.

On the drawings, an electric motor 1 drives shaft 2 which has rigidly connected thereto the worm 3 meshing with worm gear 4. This worm gear 4 is keyed to a hollow shaft 5, the hollow shaft, worm and worm gear being housed in a casing 6 bolted to a support 7, said casing serving as a bearing for shaft 5.

Hollow shaft 5 extends beyond the housing 6 and has keyed thereto an abrasion wheel 8, fixedly secured to a hub 9. A ball thrust bearing 10 separates the hub 9 from housing 6. By the mechanism described, it will be apparent that motor 1 will rotate abrasion wheel 8 at a speed dependent upon reduction gearing 3 and 4.

Passing freely through hollow shaft 5 is a second shaft 11 which also passes through the center of hub 9 and abrasion wheel 8. A bridge member 12 is secured to this projecting end of shaft 11 by means of a washer and nut. The other end of shaft 11 projects beyond housing 6 and has connected thereto a bucket 13 by means of a flexible cable 14 passing over a pulley 15.

The bridge member 12 has two clamping members 16 connected to one face thereof by means of wing nuts 17, these clamping members serving to retain samples of the material to be tested, such as those designated by numeral 18, in abutting surface engagement with abrasion wheel 8. It will be seen that samples 18 will be pressed against abrasion wheel 8 with constant or adjustable pressure, depending upon the weighting of bucket 13. Such weighting may be accomplished by the introduction of shot or water into bucket 13, or by any other suitable means.

A lever 19 is connected to bridge 12 and has attached thereto a second bucket 20 and a spring balance 21. By means of this bucket and spring balance a fine adjustment of the force exerted by lever 19 may be had. The range of movement of the lever 19 may be limited by stops 22. By a simple calculation of the effective lever arms, and the forces, the horse power developed by arm 19 may be determined.

Friction and abrasion between test pieces 18 and wheel 8 develop heat and a cooling blast of air or a suction device may be provided at the wheel for cooling purposes and the removal of the abrasive dust.

In one mode of operation of the machine, test pieces of rubber or any other material to be tested are inserted in clamps 16 and secured to bridge 12, said test pieces having, for example, a surface of 4 square centimeters. Bucket 13 is then weighted with a standard weight to exert a known pressure between wheel 8 and the test pieces. Motor 1 is then started and bridge 12, with attached lever 19, is entrained by rotation of the abrasive wheel in surface contact with the test pieces. Complete rotation of arm 19 is prevented by stops 22. Bucket 20 is now weighted until lever 19 is approximately balanced, and the spring balance 21 is used to secure the final balance of the arm. After the abrasive wheel has been allowed to run for a given number of revolutions, the loss of the test pieces is measured, either by weighing or any other means. By the data thus obtained, the loss per horse power hour for the tested pieces may be obtained.

Another method of practicing this invention is to run the abrasive test on different samples under constant power. The variations of abrasive resistance are then taken care of by varying the pressure under which the samples are applied to the wheel, taking care, of course, that the wheel runs at constant speed for a known testing interval. Under these conditions, calculation of the results is entirely eliminated. The abrasion loss is directly proportional to the energy spent during abrasion, and as this energy is kept constant in different tests, the abrasion loss represents directly the comparative wearing resistance of the samples.

In operating the apparatus in the above-described manner, the lever 19 is loaded with a constant weight. The load in bucket 13 is then varied, thus varying the surface pressure between the sample and wheel, until lever 19 balances while the wheel is running. Each set of test samples is therefore made to transmit a constant power and their loss is directly proportional to their resistance to wear.

It will be understood that above machine and method of test may be varied. The machine is, of course, capable of many changes without departing from this invention, which is limited only as defined in the following claims.

I claim:—

1. The method of testing a sample of material for wear which consists in rotating an abrasion member, holding the test sample thereagainst to thereby transmit power from said abrasion member by means of said sample, and measuring the loss of the sample per unit of power transmitted.

2. The method of comparing samples of material for wear which consists in transmitting power by means of rubbing engagement between each sample and an abrasion member, determining the resulting loss of each sample per unit of power transmitted, and evaluating said samples upon a basis of said loss in volume.

3. The method of comparing samples of material for wear which consists in transmitting power by rubbing engagement between each sample and an abrasion member, determining the loss of each sample due to the transmission of equal power, and evaluating the said samples in accordance with their respective losses.

4. The method of testing samples of material for wear which consists in pressing a carrier member having a sample mounted thereon and an abrasion member in surface engagement, rotating one of said members, transmitting an arbitrary unit of power to the other of said members through the rubbing engagement thereof, by varying the surface pressure between said members, and measuring the loss in volume of the sample.

5. The method of comparing samples of material for wear which consists in rotating an abrasive member, pressing each sample into surface engagement therewith, transmitting power from said rotating abrasive member to a power measuring device attached to each sample, adjusting the pressure of each sample against the abrasive member to transmit the same power by each sample, and evaluating the samples in accordance with their respective losses.

6. In a machine for testing the wear resistance of a material, the combination of an abrasive wheel rotated by a mechanical power device, a bridge for pressing the sample of the material to be tested against the rotating abrasive wheel, means for varying said pressure, and adjustable torque measuring means connected to said bridge.

In testimony whereof, I affix my signature.

IRA WILLIAMS.